(12) United States Patent
Bendlin et al.

(10) Patent No.: US 11,140,577 B2
(45) Date of Patent: Oct. 5, 2021

(54) ENERGY-EFFICIENT WIRELESS COMMUNICATIONS FOR ADVANCED NETWORKS WITH LOW-RESOLUTION DIGITAL-TO-ANALOG CONVERTERS

(71) Applicant: AT&T Intellectual Property I, L.P., Atlanta, GA (US)

(72) Inventors: Ralf Bendlin, Cedar Park, TX (US); Arunabha Ghosh, Austin, TX (US); Aditya Chopra, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 17/061,043

(22) Filed: Oct. 1, 2020

(65) Prior Publication Data
US 2021/0022038 A1    Jan. 21, 2021

Related U.S. Application Data

(63) Continuation of application No. 16/137,748, filed on Sep. 21, 2018, now Pat. No. 10,834,632.

(51) Int. Cl.
*H03M 1/00* (2006.01)
*H04W 28/06* (2009.01)
*H04B 7/0456* (2017.01)

(52) U.S. Cl.
CPC .......... *H04W 28/06* (2013.01); *H04B 7/0456* (2013.01)

(58) Field of Classification Search
CPC .......... H03M 1/12; H03M 1/164; H03M 1/66; H04W 28/06; H04B 7/0456; H04B 7/0413; Y02D 30/70

(Continued)

(56) References Cited

U.S. PATENT DOCUMENTS 5,142,666 A * 8/1992 Yoshizawa ............ G06N 3/04
                                                          706/38
5,321,401 A    6/1994 White
(Continued)

FOREIGN PATENT DOCUMENTS

EP    3248291 A1    11/2017
KR    101102796 B1   1/2012

OTHER PUBLICATIONS

Goes et al., "High-Linearity Calibration of Low-Resolution Digital-to-Analog Converters," IEEE International Symposium on Circuits and Systems, 1994, pp. 345-348, IEEE, 4 pages.

(Continued)

*Primary Examiner* — Jean B Jeanglaude
(74) *Attorney, Agent, or Firm* — Amin, Turocy & Watson, LLP

(57) ABSTRACT

Facilitating energy-efficient wireless communications for advanced networks (e.g., 4G, 5G, and beyond) with low-resolution digital-to-analog converters is provided herein. Operations of a system can comprise determining first values. Respective values of the first values can be digital samples of transmission and reception chains determined based on symbols transformed from bits. The operations can also comprise facilitating a quantization of the first values resulting in second values. Facilitating the quantization can be based on a cost function associated with processing the first values. Further, the operations can comprise outputting the second values as a continuous time signal over antennas of a base station device. The second values can comprise fewer values than the first values.

20 Claims, 16 Drawing Sheets

(58) Field of Classification Search
USPC .......................................................... 341/126
See application file for complete search history.

(56) References Cited

U.S. PATENT DOCUMENTS

| | | | |
|---|---|---|---|
| 5,323,159 A | 6/1994 | Imamura et al. | |
| 5,534,863 A | 7/1996 | Everitt et al. | |
| 5,583,501 A | 12/1996 | Henrion et al. | |
| 5,614,903 A | 3/1997 | Oyama | |
| 6,310,908 B1 | 10/2001 | Reed et al. | |
| 7,038,608 B1 | 5/2006 | Gilbert | |
| 7,231,312 B2 * | 6/2007 | Tanizawa | G01R 33/072 702/130 |
| 7,489,746 B1 | 2/2009 | Awater et al. | |
| 7,570,696 B2 | 8/2009 | Maltsev et al. | |
| 7,657,228 B2 * | 2/2010 | Rubin | H04B 1/123 455/63.1 |
| 7,990,298 B1 | 8/2011 | Friedmann et al. | |
| 8,471,737 B2 | 6/2013 | Iso et al. | |
| 8,520,576 B2 | 8/2013 | Kim et al. | |
| 8,659,457 B2 | 2/2014 | Eliezer et al. | |
| 9,059,733 B2 | 6/2015 | Narathong et al. | |
| 9,094,034 B2 | 7/2015 | Chen et al. | |
| 9,210,535 B2 * | 12/2015 | Kheirkhahi | H04B 1/525 |
| 9,484,943 B2 | 11/2016 | Op | |
| 9,577,685 B1 * | 2/2017 | Mirzaei | H04B 1/0475 |
| 9,641,186 B2 | 5/2017 | Thomsen et al. | |
| 9,712,218 B2 | 7/2017 | Singh | |
| 9,729,215 B2 | 8/2017 | Rahman et al. | |
| 9,825,643 B1 | 11/2017 | Taylor et al. | |
| 9,831,931 B2 | 11/2017 | Gustavsson et al. | |
| 9,900,017 B1 | 2/2018 | Clark | |
| 10,230,384 B2 * | 3/2019 | Hossain | H04L 25/03038 |
| 2014/0099893 A1 * | 4/2014 | Kheirkhahi | H04J 11/0023 455/41.2 |
| 2016/0241323 A1 | 8/2016 | Ko et al. | |
| 2017/0019122 A1 | 1/2017 | Onishi | |
| 2018/0019791 A1 | 1/2018 | Molev et al. | |

OTHER PUBLICATIONS

Frey et al., "On the Static Resolution of Digitally Corrected Analog-to-Digital and Digital-to-Analog Converters With Low-Precision Components," IEEE Transactions on Circuits and Systems, Jan. 2007, pp. 229-237, vol. 54, No. 1, IEEE, 9 pages.

Kup et al., "A Bit-Stream Digital-to-Analog Converter with 18-b Resolution," IEEE Journal of Solid-State Circuits, Dec. 1991, pp. 1757-1763, vol. 26, No. 12, IEEE, 7 pages.

Park et al., "A Digital-to-Analog Converter Based on Differential-Quad Switching," IEEE Journal of Solid-State Circuits, Oct. 2002, pp. 1335-1338, vol. 37, No. 10, IEEE, 4 pages.

Non-Final Office Action received for U.S. Appl. No. 16/137,748 dated Apr. 9, 2020, 24 pages.

* cited by examiner

ENERGY-EFFICIENT WIRELESS COMMUNICATIONS FOR ADVANCED NETWORKS WITH LOW-RESOLUTION DIGITAL-TO-ANALOG CONVERTERS

CROSS-REFERENCE TO RELATED APPLICATIONS

The subject patent application is a continuation of, and claims priority to, U.S. patent application Ser. No. 16/137,748, filed Sep. 21, 2018, and entitled "ENERGY-EFFICIENT WIRELESS COMMUNICATIONS FOR ADVANCED NETWORKS WITH LOW-RESOLUTION DIGITAL-TO-ANALOG CONVERTERS," the entirety of which application is hereby expressly incorporated by reference herein.

TECHNICAL FIELD

This disclosure relates generally to the field of mobile communication and, more specifically, to, energy-efficient wireless communication systems for advanced networks (e.g., 4G, 5G, and beyond) with low-resolution digital-to-analog converters (DACs).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
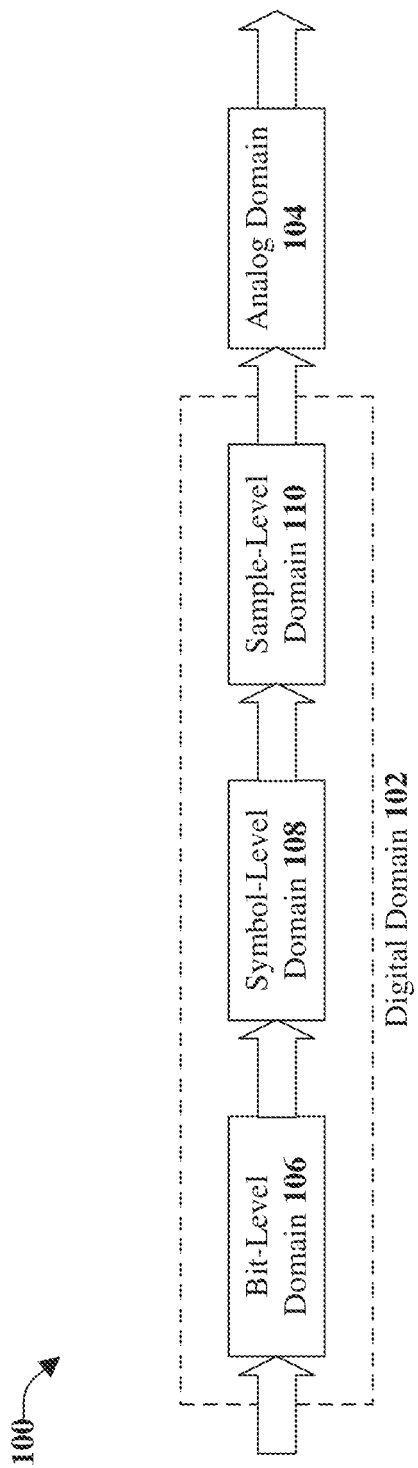
FIG. 1 illustrates an example, non-limiting block diagram of a transmitter for a wireless communication system in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate energy-efficient wireless communication with low-resolution digital-to-analog converters. In one embodiment, described herein is a system that can comprise a processor and a memory that stores executable instructions that, when executed by the processor, facilitate performance of operations. The operations can comprise determining first values. Respective values of the first values can be digital samples of transmission and reception chains determined based on symbols transformed from bits. The operations can also comprise facilitating a quantization of the first values resulting in second values. Facilitating the quantization can be based on a cost function associated with processing the first values. Further, the operations can comprise outputting the second values as a continuous time signal over antennas of a base station device. The second values can comprise fewer values than the first values.

In an example, facilitating the quantization can comprise training a model on respective analog precoder weights for the respective values of the first values based on the cost function and performance indicators. Further to this example, training the model can comprise choosing the respective analog precoder weights to minimize the cost function according to a group of performance indicators.

According to some examples, facilitating the quantization can comprise minimizing a cost associated with processing the first values. In other examples, facilitating the quantization can comprise reducing a number of bits per sample of the digital samples based on a defined number of bits. In further examples, facilitating the quantization can comprise reducing a sampling rate of the digital samples based on a defined number of sampling rates.

Facilitating the quantization, in some implementations, can comprise facilitating the quantization at a digital-to-analog conversion stage of a transmitter (e.g., a base station device) of a wireless communications system. In an example, facilitating the quantization can comprise utilizing, in the transmitter, a non-linear filter. In another example, the memory is a first memory, and facilitating the quantization can comprise utilizing, in the transmitter, a linear filter that comprises a second memory.

Another embodiment relates to a method that can comprise facilitating, by a network device of a wireless network and comprising a processor, a reduction of a first quantity of input values to a second quantity of output values. The input values can correspond to digital samples of transmission and reception chains derived from symbols transformed from bits. Further, facilitating the reduction can be based on a cost function associated with processing the first quantity of input values. The method can also comprise outputting, by the network device, the second quantity of output values as a continuous time signal over a group of antennas associated with the network device. The second quantity of output values is less than the first quantity of input values.

In some implementations, the method can comprise training, by the network device, a model on a group of precoder weights associated with the first quantity of input values and based on the cost function of performance indicators associated with the first quantity of input values. Further, the method can comprise choosing the group of precoder weights to minimize the cost function based on the performance indicators. Alternatively, or additionally, the method can comprise choosing the group of precoder weights to maximize the cost function based on the performance indicators.

According to some implementations, the network device can comprise a digital-to-analog converter that comprises a non-linear filter. In additional or alternative implementations, the network device can comprise a digital-to-analog converter that comprises a linear filter with memory.

Another embodiment relates to a machine-readable storage medium, comprising executable instructions that, when executed by a processor, facilitate performance of operations. The operations can comprise transforming symbols into digital samples. The symbols can be transformed from bits. The digital samples can be from transmission and reception chains. The operations can also comprise mapping the digital samples to output values. The mapping can be based on a cost function associated with processing the digital samples. Further, the operations can comprise outputting the output values as a continuous time signal over antennas associated with a network device. A first quantity of a first number of the digital samples is larger than a second quantity of a second number of the output values.

In an example, mapping the digital samples to output values can comprise utilizing historical input data and historical output data. The historical input data can be based on previously determined groups of digital samples. The historical output data can be based on output values previously output.

In another example, mapping the digital samples to the output values can comprise facilitating the mapping at a digital-to-analog conversion stage of a transmitter of a wireless communications system. The digital-to-analog conversion stage can comprise a non-linear filter. Mapping the digital samples to the output values, in some examples, can comprise facilitating the mapping at a digital-to-analog conversion stage of a transmitter of a wireless communications system. The digital-to-analog conversion stage can comprise a linear filter that comprises a data store.

The various aspects provided herein relate to energy-efficient wireless communication systems with low-resolution digital-to-analog converters (DACs) in particular. Massive Multiple-Input and Multiple-Output (MIMO) systems based on all-digital beamforming is a powerful technique that holds the promise of improving coverage and capacity of mobile wireless networks. Both theoretical framework as well as specification-based solutions such as Frequency Division MIMO (FD-MIMO) are already being heralded as the biggest innovation that will dominate the cellular industry over the next decade. In spite of the benefits associated with this technology it comes with at least two main challenges. Digital massive MIMO is not easy to adopt in millimeter wave (mmWave) spectrum as well as in Centralized Random Access Network (C-RAN) architectures. This is a fundamental problem with existing 5G networks that will utilize both mmWave technology as well as virtualized radio access networks based on C-RAN architectures.

One of the design tenants of centralized radio access networks (C-RANs) is to centralize and virtualize the digital baseband processing chain as much as possible. State-of-the-art all-digital massive MIMO systems, however, cannot be deployed in a centralized fashion due to challenges in transporting the digital samples for a large number transmission and reception (TRx) chains from a central location to the edge of the network. In frequencies of interest, the number of digital chains for massive MIMO (FD-MIMO) can easily be in the range of around 64 to about 256, therefore making the burden on the transport network rather difficult to achieve.

In addition, mmWave spectrum typically allows for usage of very large system bandwidths. This implies that the analog-to-digital converters (ADCs) and digital-to-analog converters (DACs) must work at very high sampling rates to meet the Nyquist criterion. Such ADCs and DACs tend to become extremely power hungry making it impossible to operate a large number of Transceiver (TRx) chains in mmWave spectrum. Consequently, conventional mmWave systems employ hybrid beamforming techniques where most of the antenna elements are beamformed in the analog Radio Frequency (RF) domain whereas only a small number of TRx chains are exposed in the digital domain. While this drastically reduces the number of digital TRx chains it comes with a large amount of performance loss (e.g., achievable Multi User MIMO (MU-MIMO) gain) especially in channels where the angular spread of the channel is significant.

The various aspects provided herein relate to energy-efficient wireless communication with low-resolution digital-to-analog converters (DACs). Power consumption of DACs scales approximately linearly in sampling rate and approximately exponentially in the number of bits per sample. Hence, the various embodiments discussed facilitate reduction of the number of bits per sample, the sampling rate, or combinations of both the number of bits per sample and the sampling rate at the digital-to-analog conversion stage. DACs that use very few bits for signal quantization (e.g., one, two or three bits for each I and Q phase) are utilized together with signal processing algorithms and circuits that mitigate the impact of such low-resolution DACs on key performance indicators (KPI) including but not limited to one or more of throughput (bits-per-second), signal-to-interference-and-noise ratio (SINR), bit error rate (BER), adjacent channel leakage ratio (ACLR), out-of-band emissions (OOBE), error vector magnitude (EVM), MU-MIMO gain, and power consumption as well as the capital and operational expenditure (CAPEX/OPEX) of the system. Examples of signal processing algorithms and circuits include, but are not limited to, multiuser superposition transmission (MUST) in the power and/or antenna domain, non-uniform sampling techniques, spatio-temporal joint sampling, optimal bit allocation, power amplifier (PA) design, digital pre-distortion (DPD), radio frequency (RF) coupling, matching networks, receiver design including, but not limited to, receive signal processing, transmitter design including, but not limited to, transmit signal processing and precoding, RF characterization (e.g., OOBE, EVM, and so on), waveform design, analog and digital pulse shaping, time/frequency synchronization, channel estimation, and/or reference signal design. The various embodiments provided herein address the transmitter side of a complete end-to-end system solely relying on low-resolution signal processing algorithms and components.

Advantages of the disclosed aspects include a wireless communication system with low-resolution digital-to-analog converters, which allows for all-digital beamforming with massive numbers of antennas, network virtualization, low power consumption, low cost, increased spectral efficiency, lower latency, new centralized network architectures, wireless communications in new spectrum regimes above frequency ranges targeted by state-of-the-art communication systems amongst others.

In traditional cellular communication systems, the carrier frequency is in the 100 megahertz (MHz) range or up to a few gigahertz (GHz). The size of the antenna is related to the carrier frequency and the smaller the carrier frequency, the larger the antenna. For that reason, in traditional communication systems there can be two, four, or may be eight antennas on a pole of a base station device. Since the carrier frequencies in traditional communication systems are generally in the sub 6 GHz range, the antennas are large and only a few can be placed on the base station device.

For a 5G system, the carrier frequency range is greatly extended. For example, in the United States, the range can go up to 28 GHz or even 39 GHz. Due to the higher carrier frequency, the size of the antenna shrinks, resulting in very small antennas. Therefore, instead of having a limited number of antennas (e.g., two antennas, four antennas, eight antennas) on a base station device, there can be over one hundred antennas (e.g., one hundred twenty-eight antennas or more) on the base station device. Having a large number of antennas is beneficial. However, as the number of antennas scales, so does the circuitry, the power consumption, and the costs. This is because instead of having a small number of radios (e.g., two, four, eight) there can be over one hundred radios, which can be cost prohibitive and even more prohibitive in terms of power consumption. To overcome this problem, traditional 5G systems can use a limited number of radios (e.g., two or four) and map those radios to the one hundred or more antennas, which does not optimize the system efficiency.

A component that consumes a large amount of power are digital to analog converters (DAC) due to the signal processing and calculations performed by the DAC. The power consumption of a DAC depends on the number of bits. For example, the higher the number of bits, the higher the precision, and the higher the power consumption. Traditionally 12-bit DACs or 14-bit DACs have been utilized.

According to various aspects provided herein, instead of having a limited number of radios (e.g., four radios) with high precision and a large number of antennas (e.g., about one hundred antennas), there can be a large number of radios (e.g., around one hundred radios for the around one hundred antennas) and the number of bits per radio can be significantly reduced. The reduction in the number of bits can reduce the power consumption, allowing for more radios or more DACs for the same (or a similar) cost or power consumption.

FIG. 1 illustrates an example, non-limiting block diagram of a generic transmitter 100 for a wireless communication system in accordance with one or more embodiments described herein. The generic transmitter can be broadly divided into a digital subsystem (e.g., a digital domain 102) and an analog subsystem (e.g., an analog domain 104). The digital subsystem can conceptually be categorized into three subsystems, namely, a bit-level domain 106, a symbol-level domain 108, and a sample-level domain 110.

In the digital domain 102 (e.g., the digital subsystem) time is considered to be of discrete nature whereas in the analog domain 104 (e.g., the analog subsystem) time is considered to be continuous. Discrete time and continuous time are related by the simple equation $x[n]=x(t)|_{t=nT}$, where $x(t)$ is the continuous time signal and $x[n]$ is the discrete time signal whose values at time n correspond to the values of the continuous time signal $x(t)$ at times $t=nT$. Furthermore, the values $\{x[n]\}|_{n=-\infty}^{\infty}$ of the discrete time signal $x[n]$ are represented by an alphabet $\mathcal{F}$ with a given precision. For example, $\mathcal{F}$ can be binary with $\mathcal{F}=\{-1,+1\}$ or $\mathcal{F}=\{0,+1\}$. Further, $\mathcal{F}$ can also have infinite precision. For example, $\mathcal{F}=\mathbb{R}$ or $\mathcal{F}=\mathbb{C}$ in case of real and complex numbers, respectively. Generally, $\mathcal{F}$ comprises a fixed number of elements denoted by $|\mathcal{F}|$, e.g., $|\{-1,+1\}|=2$ or $|\mathbb{C}|=\infty$. The size of $|\mathcal{F}|$, in general, depends on the resolution with which members of $\mathcal{F}$ are represented. For example, for one bit $|\mathcal{F}|=2$, for two bits $|\mathcal{F}|=4$, and for n bits $|\mathcal{F}|=2^n$.

In the bit-level domain 106, values of $x[n]$ are represented by either a zero or a one (e.g., $\mathcal{F}=\{0,+1\}$ and $|\mathcal{F}|=2$). The bit-level domain of a wireless transmitter can comprise cyclic redundancy check (CRC) attachment, segmentation, channel coding/forward error correction (FEC), rate matching, and scrambling to name a few.

Figure 2:
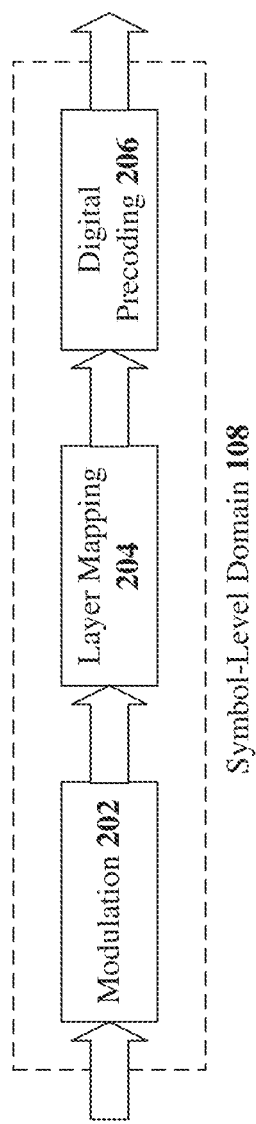
FIG. 2 illustrates an example, non-limiting block diagram of the symbol-level domain of the transmitter FIG. 1 in accordance with one or more embodiments described herein.

With reference now to FIG. 2 illustrated is an example, non-limiting block diagram of the symbol-level domain 108 of the transmitter of FIG. 1 in accordance with one or more embodiments described herein. Repetitive description of like elements employed in other embodiments described herein is omitted for sake of brevity.

In the symbol-level domain 108, binary inputs from the bit-level domain 106 are first mapped to a modulation alphabet $\mathcal{M}$ during modulation 202, resulting in modulated symbols. The modulated symbols are then mapped to layers during layer mapping 204. Thereafter, the layers are precoded during digital precoding 206. The modulation alphabet $\mathcal{M}$ is a special case of the set $\mathcal{F}$ in the sense that the precision of $\mathcal{M}$ is infinite, however, $|\mathcal{M}|$ is finite. For example, for quadrature phase-shift keying (QPSK), $$\mathcal{M}=\left\{e^{\frac{\pi}{4}},e^{\frac{3\pi}{4}},e^{-\frac{\pi}{4}},e^{-\frac{3\pi}{4}}\right\},$$

however, $|\mathcal{M}|=4$.

Figure 3:
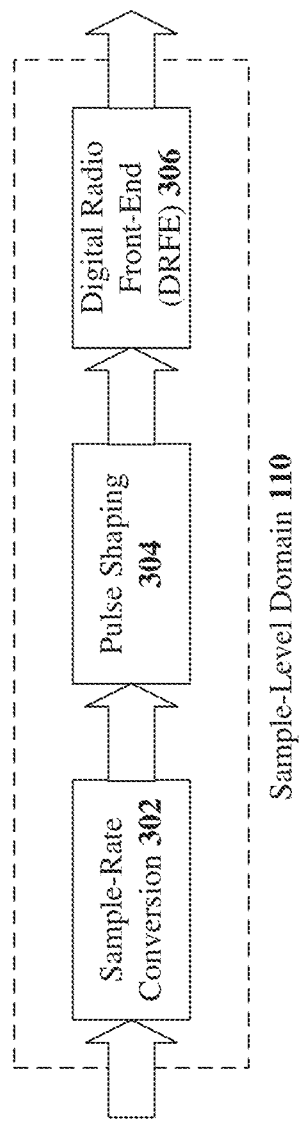
FIG. 3 illustrates an example, non-limiting block diagram of the sample-level domain of the transmitter of FIG. 1 in accordance with one or more embodiments described herein.

FIG. 3 illustrates an example, non-limiting block diagram of the sample-level domain 110 of the transmitter of FIG. 1 in accordance with one or more embodiments described herein. Repetitive description of like elements employed in other embodiments described herein is omitted for sake of brevity.

The symbols output by the symbol-level domain 108 need to be processed for transmission over the air interface. Generally, this is performed by first up-sampling the signal during sample-rate conversion 302. The up-sampled symbols are then pulse-shaped (illustrated as pulse shaping 304) and passed to a digital radio front-end (DRFE 306). Pulse shaping 304, amongst others, can be performed to reduce the bandwidth of the transmitted signal which reduces adjacent channel leakage and out-of-band emissions. The DRFE 306 stage can comprise additional filters, digital up-conversion (DUC), crest factor reduction (CFR), and digital pre-distortion (DPD) to name a few. The DRFE can also be used to model (system design) or mitigate (system operation) in-phase/quadrature (I/Q) impairments.

Figure 4:
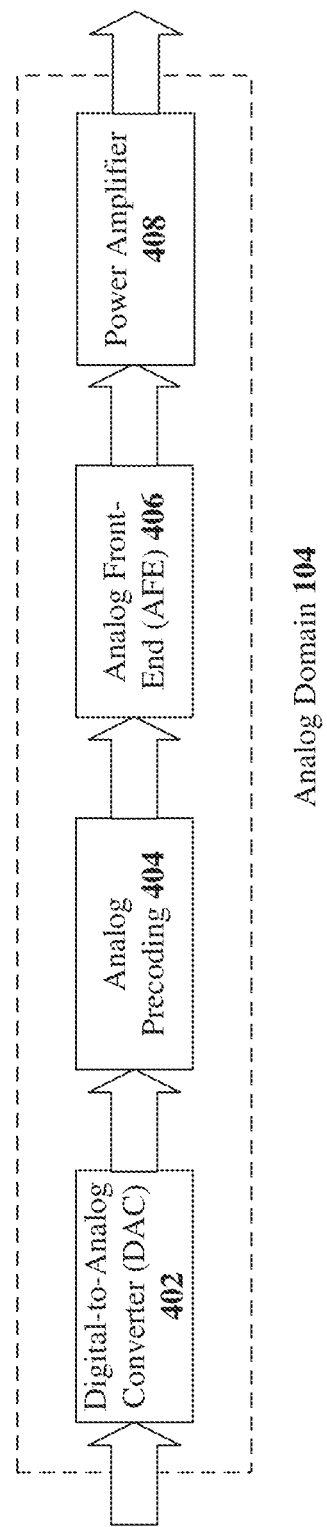
FIG. 4 illustrates an example, non-limiting block diagram of the analog domain of the transmitter of FIG. 1 in accordance with one or more embodiments described herein.

FIG. 4 illustrates an example, non-limiting block diagram of the analog domain 104 of the transmitter of FIG. 1 in accordance with one or more embodiments described herein. Repetitive description of like elements employed in other embodiments described herein is omitted for sake of brevity.

Figure 5:
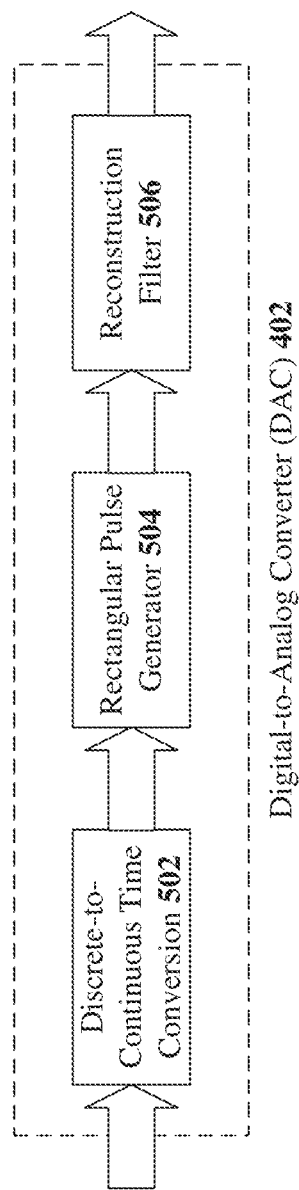
FIG. 5 illustrates the digital to analog converter of the transmitter of FIG. 4 in accordance with one or more embodiments described herein.

The analog domain 104 can convert the discrete time signal x[n] into a continuous time signal x(t). This stage is referred to as the digital-to-analog conversion (DAC 402). With reference also to FIG. 5, which illustrates the DAC 402 of the transmitter of FIG. 4 for a wireless communication system in accordance with one or more embodiments described herein. Repetitive description of like elements employed in other embodiments described herein is omitted for sake of brevity.

Figure 6:
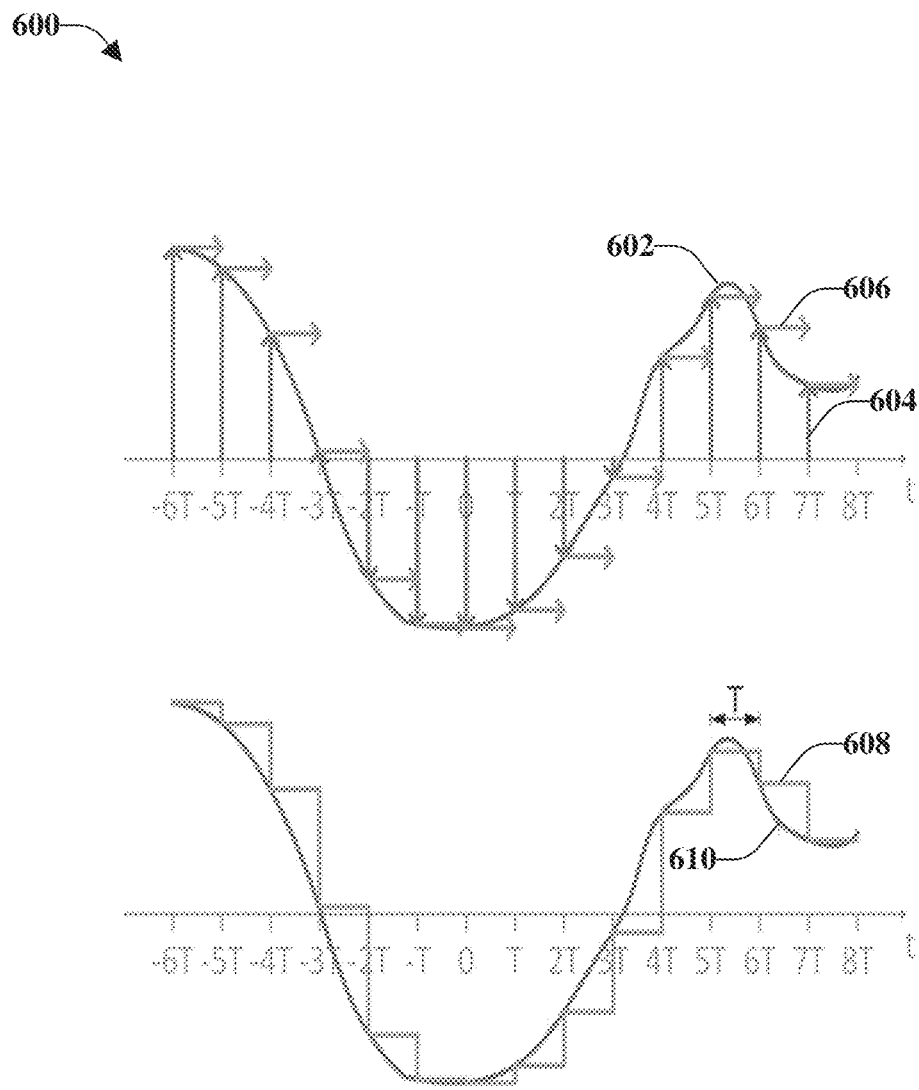
FIG. 6 illustrates example, non-limiting charts representing the process of FIG. 5 in accordance with one or more embodiments described herein.

The DAC 402 can first convert, during a discrete-to-continuous-time conversion 502, the set $\{x[n]\}|_{n=-\infty}^{\infty}$ into a continuous time signal $\Sigma_{n=-\infty}^{\infty} x[n]\delta(t-nT)$, where $\delta(t)$ is the Dirac delta function. This impulse train is then filtered by a rectangular pulse generator 504 followed by a reconstruction filter 506. FIG. 6 illustrates example, non-limiting charts representing the process of FIG. 5 in accordance with one or more embodiments described herein. Repetitive description of like elements employed in other embodiments described herein is omitted for sake of brevity.

As illustrated in FIG. 6, a continuous time signal x(t) 602 is represented by the impulse train $\Sigma_{n=-\infty}^{\infty} x[n]\delta(t-nT)$ 604, which is filtered by a zero-order hold 606. For sufficiently small values of T the output waveform 608 can resemble the signal x(t) 610 after passing through the reconstruction filter 506.

With continuing reference to FIG. 4, the continuous time signal x(t) at the output of the DAC 402 can be passed to an analog precoder 404. More precisely, the analog signal x(t) can be thought of as a voltage with amplitude |x(t)| and phase $\measuredangle x(t)$ whereby |x(t)| and $\measuredangle x(t)$ change continuously in time and have infinite precision, for example, $x(t)=|x(t)|e^{j\measuredangle x(t)}\in\mathbb{C}$ where $j=\sqrt{-1}$. The analog precoder (e.g., analog precoding 404) can manipulate the amplitude |x(t)| and the phase $\measuredangle x(t)$ of the input x(t) according to a digital control signal that feeds into the analog precoder 404. The analog precoding stage (e.g., the analog precoder 404) is followed by the analog front-end (AFE 406), which contains additional analog filters and the mixer. The signal is then passed to a power amplifier 408 before the signal is transmitted over the air interface.

As previously mentioned, the power consumption of a DAC scales approximately linearly in sampling rate and approximately exponentially in the number of bits per sample. Hence, one way to reduce power consumption is to reduce the sampling rate. However, as depicted in FIG. 6, the larger the value of T the worse the output waveform 608 of the zero-order hold circuit approximates the desired waveform 602. According to one or more embodiments, the rectangular pulse generator 504 and the reconstruction filter 506 can be replaced by non-linear filters or linear filters with memory.

Figure 7:
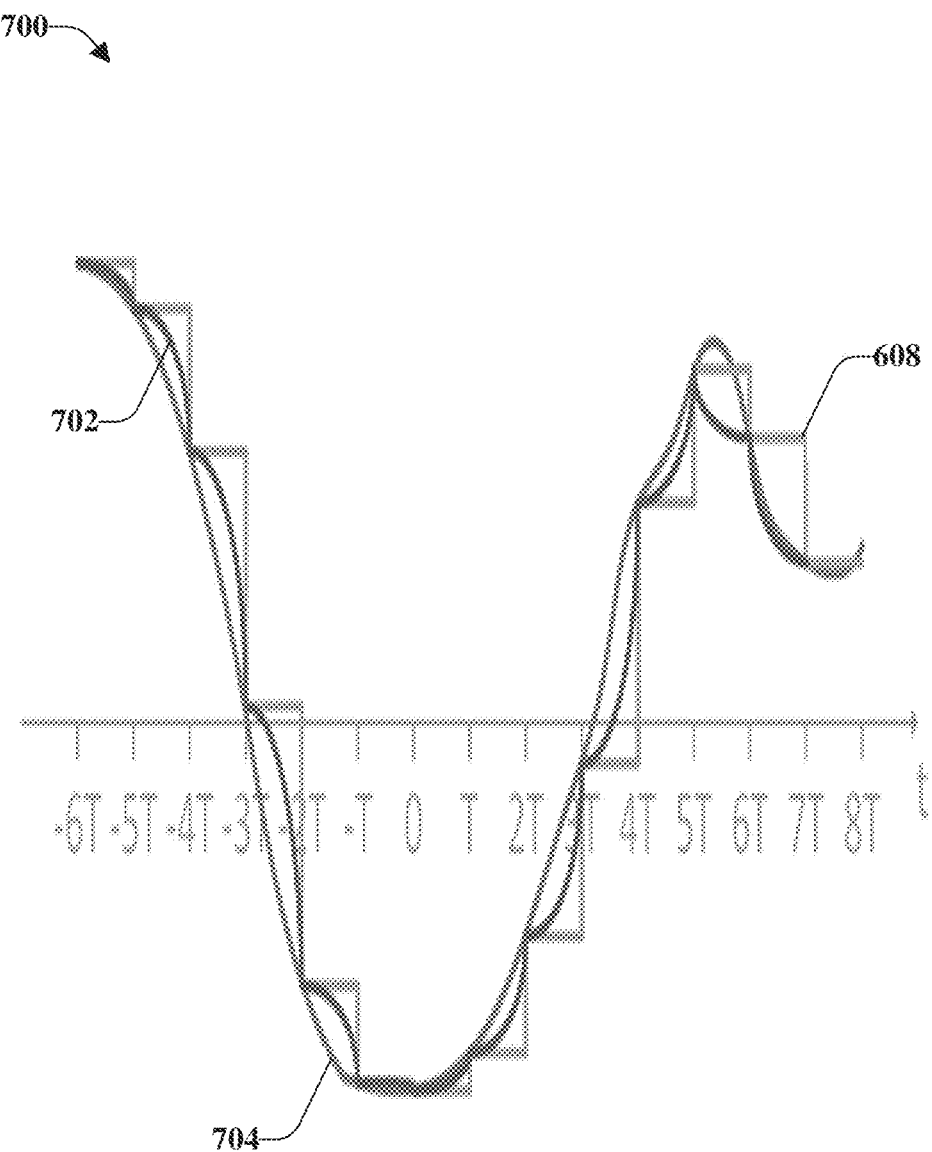
FIG. 7 illustrates an example, non-limiting chart representing the output of a digital to analog converter with non-linear filters or linear filters with memory in accordance with one or more embodiments described herein.

FIG. 7 illustrates an example, non-limiting chart 700 representing the output of a DAC with non-linear filters or linear filters with memory in accordance with one or more embodiments described herein. Repetitive description of like elements employed in other embodiments described herein is omitted for sake of brevity.

As mentioned, the non-linear filters or linear filters with memory can replace the rectangular pulse generator 504 and the reconstruction filter 506. An output waveform 702 represents the output of the DAC with the non-linear filters and/or the linear filters with memory. Even for large value of T, unlike conventional filters (represented by output waveform 608), as discussed above, with the non-linear filters and/or the linear filters with memory, the output waveform 702 can resemble a desired waveform much closer than the output waveform 608 of FIG. 6. For example, non-linear circuits or circuits with memory can be used in the DAC 402 to implement the described behavior of the DAC. Moreover, the DAC can be implemented with memory whereby the output at time r depends on inputs $x(t)|_{t=nT\leq \tau}$. In another example, outputs of the DAC 402 can be fed back into the DAC for joint processing with the inputs (e.g., via a feedback loop).

Figure 8:
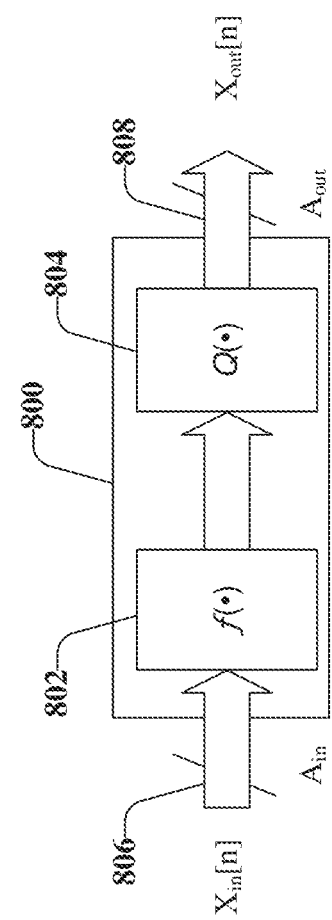
FIG. 8 illustrates an example, non-limiting system for providing efficiencies in a wireless communications system in accordance with one or more embodiments described herein.

FIG. 8 illustrates an example, non-limiting, subsystem 800 for providing efficiencies in a wireless communications system in accordance with one or more embodiments described herein. Repetitive description of like elements employed in other embodiments described herein is omitted for sake of brevity.

In general, every building block in the symbol-level domain 108 and sample-level domain 110 (or combinations thereof) can be thought of as another building block (e.g., the subsystem 800) with a function 802 followed by a quantizer 804. One or more inputs 806 ($x_{in}[n]$) can be received and one or more outputs 808 ($x_{out}[n]$) can be determined. More precisely, an output $x_{out}[n]=Q(f(x_{in}[n]))$, where $x_{in}[n]\in \mathcal{F}_{in}$ and $x_{out}[n]\in \mathcal{F}_{out}$. For the cases where $|\mathcal{F}_{in}|<\infty$ and $|\mathcal{F}_{out}|<\infty$ a building block (e.g., the subsystem 800) can furthermore be thought of as a look-up table (LUT) that maps elements in $\mathcal{F}_{in}$ to $\mathcal{F}_{out}$ according to $f$ and Q.

Figure 9:
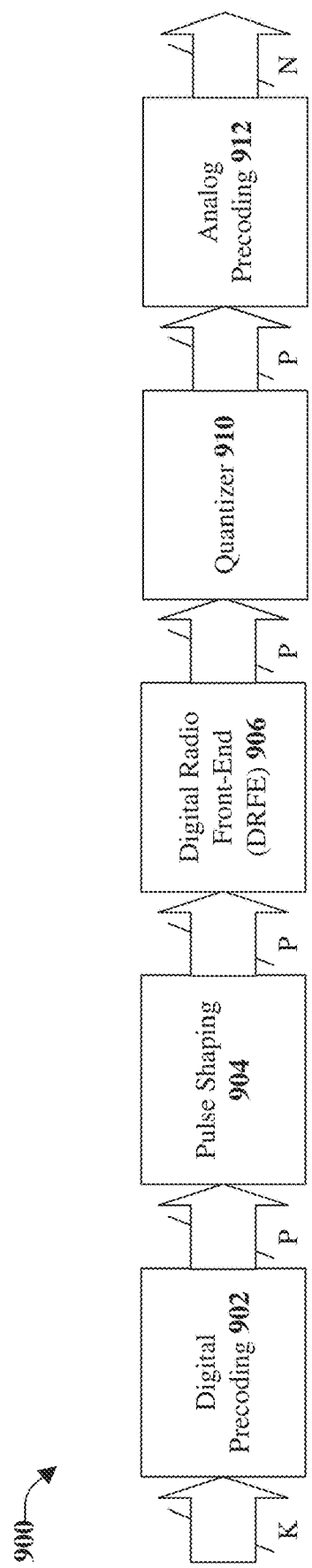
FIG. 9 illustrates an example, non-limiting system in accordance with one or more embodiments described herein.

With reference also to FIG. 9, which illustrates an example, non-limiting, system 900 in accordance with one or more embodiments described herein. Repetitive description of like elements employed in other embodiments described herein is omitted for sake of brevity.

The system 900 includes a version of the symbol-level domain 108, the sample-level domain 110, and the analog domain 104. For simplicity, the entire system is represented in discrete time, for example, $x[n]=x(t)|_{t=nT}$, and in the sample-level domain ("upsampled"). This should not be construed in the limiting sense though and is merely intended for tractability and exposition of the overall idea.

Modulated symbols mapped to K layers are precoded (e.g., digital precoding 902) resulting in P outputs where P is the number of digital transmission chains. The P outputs are then pulse shaped (e.g., pulse shaping 904) and any additional filtering including modelling of impairments is lumped into a Digital Radio Front-End (DRFE 906). The output of the DRFE 906 can have arbitrary precision $\mathcal{F}_{in}$ and a quantizer 910 can change the precision to $\mathcal{F}_{out}$ with $|\mathcal{F}_{in}|>|\mathcal{F}_{out}|$. An analog precoding 912, depicted in FIG.

9 in the digital domain, again manipulates the amplitude $|\tilde{x}(t)|$ and phase $\angle \tilde{x}(t)$ of the input $\tilde{x}(t)$ to the analog precoding 912 at times t=nT.

The output of the analog precoding 912 is finally sent to the AFE (e.g., the AFE 406) where N is the number of transmit antennas. In this context, N is generally very large (e.g., 64, 128, 256, or 512). These degrees of freedom can be used to make $|\mathbb{R}_{out}|>0$ arbitrary small while managing the KPIs subject to certain constraints as generally, the aforementioned KPIs suffer as $|\mathbb{R}_{out}|$ is decreased below a certain threshold.

Without construing the following example in the limiting sense and solely for ease of explanation, assume the digital precoder 902, the pulse shaper 904, and the DRFE 906 in FIG. 9 have infinite precision or at least $|\mathbb{R}_{in}|>>1$. Then the digital precoder 902, the pulse shaper 904, and the DRFE 906 together with the quantizer 910 can be represented by an equivalent subsystem per FIG. 8 (e.g., the subsystem 800) with:

$A_{in}=K$
$A_{out}=P$
Quantizer 910≡quantizer 804
Function $f(\bullet)\equiv$cascade of the digital precoder 902, the pulse shaper 904, and the DRFE 906

Let $\tilde{x}_n(t)$ be one of the outputs of the analog precoder 912 (n=1, ..., N). Moreover, let $p_{n,m}(t)=|p_{n,m}(t)|e^{j\angle p_{n,m}(t)} \in \varepsilon$ where $|p_{n,m}(t)|$ and $\angle p_{n,m}(t)$ represent how the analog precoder 912 manipulates the amplitude and phase of the m-th input signal (m=1, ..., P). Let $c(\vec{x}_{in}[n], \vec{\hat{x}}(t)|_{t=nT}, \vec{P}(t)|_{t=nT})$ be a cost function that relates the quality of $\vec{\hat{x}}[n]=\vec{\hat{x}}(t)|_{t=nT}\in \mathbb{C}^N$ at the output of the analog precoder with respect to the input symbols $\vec{x}_{in}[n]\in \mathcal{M}^K=\mathcal{F}_{in}^K$ of subsystem 800 (or the digital precoder 902, respectively) for a given $\vec{P}(t)|_{t=nT}$, a given set of KPIs and a given T. Further, ε represents the precision with which $p_{n,m}(t)=|p_{n,m}(t)|e^{j\angle p_{n,m}(t)}$ can be digitally controlled in the analog precoder 912 and $\vec{x}_{in}[n]$, $\vec{\hat{x}}(t)|_{t=n}$, $\vec{P}(t)|_{t=nT}$ are vectors/matrices of respective dimensions. Further, ε can be determined by the precision $\varepsilon_1$ for $|p_{n,m}(t)|\in\varepsilon_1$ and by the precision $\varepsilon_2$ for $\angle p_{n,m}(t)\in\varepsilon_2$.

According to some embodiments, the analog precoder weights $\vec{P}(t)|_{t=nT}$ are chosen such that $c(\vec{x}_{in}[n], \vec{\hat{x}}[n], P(t)|_{t=nT})$ is minimized according to a set of KPIs that may constrain the optimization. Alternatively, the analog precoder weights $\vec{p}(t)|_{t=nT}$ are chosen such that $c(\vec{x}_{in}[n], \vec{\hat{x}}[n], P(t)|_{t=nT})$ is maximized according to another set of KPIs that may constrain the optimization. Minimization/maximization of $c(\vec{x}_{in}[n], \vec{\hat{x}}[n], P(t)|_{t=nT})$ can be locally or globally whereby in the former case several minima/maxima may exist compared to the latter case where the minimum/maximum is unique. The values of $p_{n,m}(t)|_{t=nT}$ in $\vec{P}(t)|_{t=nT}$ can be calculated in closed form or obtained via iterative algorithms depending on the cost function $c(\vec{x}_{in}[n], \vec{\hat{x}}[n], P(t)|_{t=nT})$ and the set of KPIs that may constrain the optimization. The values of $p_{n,m}(t)|_{t=nT}$ in $\vec{P}(t)|_{t=nT}$ can also be computed by relaxing the cost function $c(\vec{x}_{in}[n], \vec{\hat{x}}[n], P(t)|_{t=nT})$ and/or the set of KPIs that can constrain the optimization and by projecting the solution of the relaxed optimization problem back onto the solution space of the original optimization problem, for example, $c(\vec{x}_{in}[n], \vec{y}[n], P(t)|_{t=nT})$ with the original, non-relaxed set of constraints. In another example, the sampling interval T can be part of the cost function $c(\vec{x}_{in}[n], \vec{\hat{x}}[n], P(t)|_{t=nT}, T)$ and is also optimized together with $P(t)|_{t=nT}$.

Note that the elements $p_{n,m}(t)|_{t=nT}$ of $\vec{P}(t)|_{t=nT}$ are digitally controlled according to $|p_{n,m}(t)|\in\varepsilon_1$ and $\angle p_{n,m}(t)\in\varepsilon_2$. Furthermore, the input and output of the analog precoder 912 are continuous-time signals (e.g., FIG. 9 omits the DAC 402). In some systems (e.g., the system of FIG. 4), the DAC 402 is situated between the DRFE 906 and the analog precoder 912. For the system 900 of FIG. 9, power consumption of the wireless transmitter can be significantly lowered by increasing the parameter T and decreasing the resolution of samples in the sample domain with which inputs to the DAC 402 are represented and by leveraging the degrees of freedom offered by the $p_{n,m}(t)|_{t=nT}$ in $\vec{P}(t)|_{t=nT}$ that can be digitally controlled with resolutions $|p_{n,m}(t)|\in\varepsilon_1$ and $\angle p_{n,m}(t)\in\varepsilon_2$.

In accordance with some embodiments, the performance of the quantizer 910 can be improved by introducing memory. For example, the outputs 808 can be fed back into the quantizer 804, which can quantize its inputs taking previous outputs into account. Alternatively, the quantizer 804 can store previous inputs and quantize current inputs also taking into account the stored previous inputs (e.g., historical data).

As mentioned above, the subsystem 800, which includes the quantizer 804, can represent any building block or any combination of building blocks of the wireless transmitter. In other words, the number of quantizers within the wireless transmitter is a design parameter. Subsystem 800, including function 802, can model the entire symbol and sample domain (e.g., the inputs 806 to subsystem 800 can be the outputs of the bit-level domain 106. In this example, the entire digital domain 102 has a single quantizer prior to the analog domain 104. Generally, however, each component of the wireless transmitter can be implemented according to 800 (e.g., as a subsystem with inputs 806 represented with a first resolution $\mathcal{F}_{in}$ and outputs 808 represented with a second resolution $\mathcal{F}_{out}$). Moreover, while the subsystem 800 is depicted as a function 802 followed by a quantizer 804, it can also be implemented without the quantizer as a look-up table which maps the inputs 806 to the outputs 808. In this case, $f$ in the function 802 can be implemented in the LUT.

Figure 10:
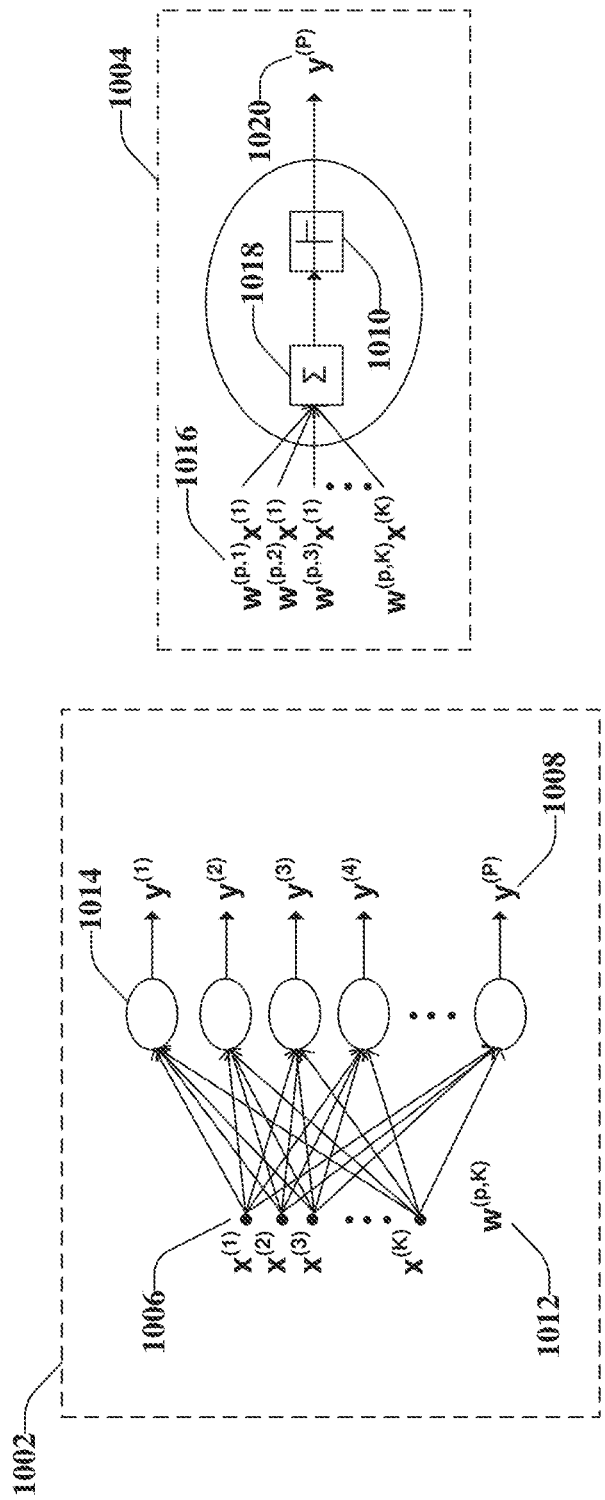
FIG. 10 illustrates example, non-limiting, subsystems in accordance with one or more embodiments described herein.

FIG. 10 illustrates example, non-limiting, subsystems in accordance with one or more embodiments described herein. Repetitive description of like elements employed in other embodiments described herein is omitted for sake of brevity.

A first subsystem 1002 is illustrated on the left and a second subsystem 1004 is illustrated on the right. The first subsystem 1002 comprises one or more inputs 1006, namely, $x^{(1)}, x^{(2)}, \ldots, x^{(K)}$. The one or more inputs 1006 can be the aforementioned inputs $\vec{x}_{in}[n]\in \mathcal{M}^k=\mathcal{F}_{in}^K$ of the subsystem 800. Note that the partition of the wireless transmitter represented by 800 can determine the dimension and resolution of $\vec{x}_{in}[n]$ and the exemplary dimension K as well as the exemplary alphabet $\mathcal{F}_{in}^K$ for $\vec{x}_{in}[n]$ above is not to be construed in the limiting sense.

The first subsystem 1002 also comprises one or more outputs 1008, namely, $y^{(1)}, y^{(2)}, \ldots y^{(P)}$. The one or more outputs 1008 can be the aforementioned outputs of the subsystem 800. For purposes of explanation, assume the function 802 is a linear function and the quantizer 804 is equivalent to quantizer 1010. Then the linear function $f$ in 802 followed by the quantizer 804 and hence the subsystem 800 is equivalent to the first subsystem 1002.

In particular, the first subsystem 1002 is referred to as a neural network and the second subsystem 1004 is referred to as a perceptron or artificial neuron. The neural network comprises the one or more inputs 1006, one or more weights 1012, one or more perceptrons 1014, and the one or more outputs 1008. Each individual perceptron of the one or more perceptrons 1014 sums up its inputs 1016 in the summations (e.g., the summation functions 1018) and outputs quantized values 1020 whereby 1010 is the quantization step. Note that a perceptron may also have a bias value as an input which is not discussed here without limiting the embodiment.

Because of the quantization step (e.g., the quantizer 804), as previously mentioned, the subsystem 800 can be thought of as a look-up table (LUT). In general, however, it is not computationally tractable to derive the LUT. For example, whereas K is generally small, $|\mathcal{F}_{in}|$ may be prohibitively large. Similarly, whereas $|\mathcal{F}_{out}|$ may be small, N may be prohibitively large. Treating the subsystem 800 as a neural network allows powerful machine learning algorithms to "learn" the optimal LUT where optimality is understood in a similar sense as above (e.g., with respect to a cost function constraint by a set of KPIs). According to some embodiments, the one or more weights 1012 of the neural network can be trained according to a cost function $$\tilde{c}(\{x^{(k)}\}_{k=1}^{K}, \{y^{(n)}\}_{n=1}^{N}, \{w^{(p,k)}\}_{k=1,n=1}^{K,N})$$

and a set of KPIs.

It is noted that the linear function $f$ in 802 of the subsystem 800 and the one or more weights 1012 of the neural network can represent an arbitrary combination of building blocks of the digital domain 102 of the wireless transmitter with low-resolution DACs and the example in FIG. 9 is not to be construed in the limiting sense. Similarly, the sampling interval T can be chosen as an additional degree of freedom whereby larger values of T may increase power efficiency at the expense of some KPIs. As one extreme case, T can be chosen as the symbol rate. Moreover, a bias $b_l$ can be added to the l-th perceptrons as yet another degree of freedom. Similarly, the threshold functions 1010 can be further optimized taking into account the desired precision $|\mathcal{F}_{out}|$ for the outputs 1008. Different threshold functions 1010 can increase the performance in regard to some KPIs at the expense of higher power consumption due to a larger $|\mathcal{F}_{out}|$.

Figure 11:
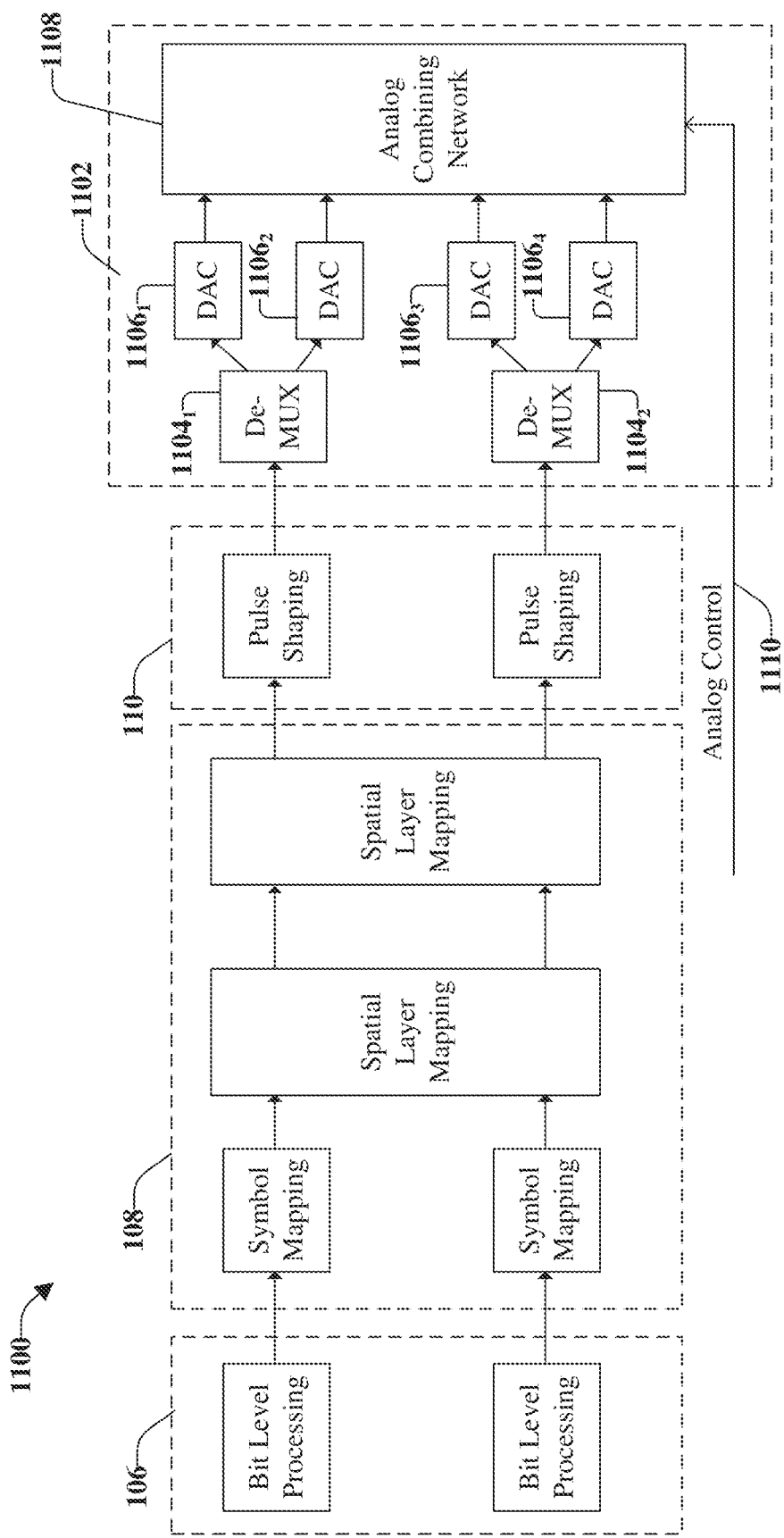
FIG. 11 illustrates an example, non-limiting, wireless transmitter with low-resolution digital to analog converters in accordance with one or more embodiments described herein.

FIG. 11 illustrates an example, non-limiting, wireless transmitter 1100 with low-resolution digital to analog converters in accordance with one or more embodiments described herein. Repetitive description of like elements employed in other embodiments described herein is omitted for sake of brevity.

The wireless transmitter 1100 comprises another example of building block combinations for the bit-level domain 106, the symbol-level domain 108, and the sample-level domain 110. A subset of the analog domain 104 is presented in FIG. 11 as a building block (e.g., a subsystem 1102) comprising a de-multiplexing stage 1104, a digital-to-analog conversion stage 1106, and an analog combining network 1108.

As illustrated, the de-multiplexing stage 1104 can comprise one or more de-multiplexers, illustrated as a first de-multiplexer $1104_1$ and a second de-multiplexer $1104_2$. Further, the digital-to-analog conversion stage 1106 can comprise one or more DACs, illustrated as a first DAC $1106_1$, a second DAC $1106_2$, a third DAC $1106_3$, and a fourth DAC $1106_4$. It is noted that although two de-multiplexers and four DACs are illustrated, the disclosed aspects are not limited to this implementation and more or fewer de-multiplexers and/or DACs can be utilized with the disclosed aspects.

According to some implementations, the traditional high-resolution DAC can be replaced with the de-multiplexer and multiple low-resolution DACs. The analog combining network 1108 can be similar to the analog precoder 404. Let $q_{r,s}(t)=|q_{r,s}(t)|e^{j\angle q_{r,s}(t)} \in \varepsilon$ where $|q_{r,s}(t)|$ and $\angle q_{r,s}(t)$ represent how the analog precoder 404 manipulates the amplitude and phase of the contribution of the s-th input signal to the r-th output. The precision $\varepsilon$ may again be determined by the precision $\varepsilon_1$ for $|q_{r,s}(t)| \in \varepsilon_1$ and by the precision $\varepsilon_2$ for $\angle q_{r,s}(t) \in \varepsilon_2$ and the weights $q_{r,s}(t)=|q_{r,s}(t)|e^{j\angle q_{r,s}(t)}$ themselves are controlled by a digital control input 1110 to the analog combining network 1108. For example, for t=nT the analog combining network 1108 can be represented by $\vec{r}(t)|_{t=nT}=\vec{Q}(t)|_{t=nT}\vec{s}(t)|_{t=nT}$ where $\vec{s}(t)|_{t=nT}$ and $\vec{r}(t)|_{t=nT}$ stack the input and output values, respectively, and $\vec{Q}(t)|_{t=nT}$ is a matrix with entries $[\vec{Q}(t)|_{t=nT}]_{r,s}=q_{r,s}(t)|_{t=nT}$. The values $q_{r,s}(t)|_{t=nT}$ are computed according to a cost function $\tilde{c}(\vec{r}(t)|_{t=nT}, \vec{Q}(t)|_{t=nT}, (\vec{s}(t)|_{t=nT})$ and a set of KPIs.

According to these embodiments, the overall energy-efficiency or power-consumption can be lowered by trading off resolution with number of DACs. In particular, the power consumption of a DAC can grow exponentially in the number of bits (e.g., higher resolution) whereas in this example, the number of DACs is increased linearly thereby achieving the overall lower power consumption.

Figure 12:
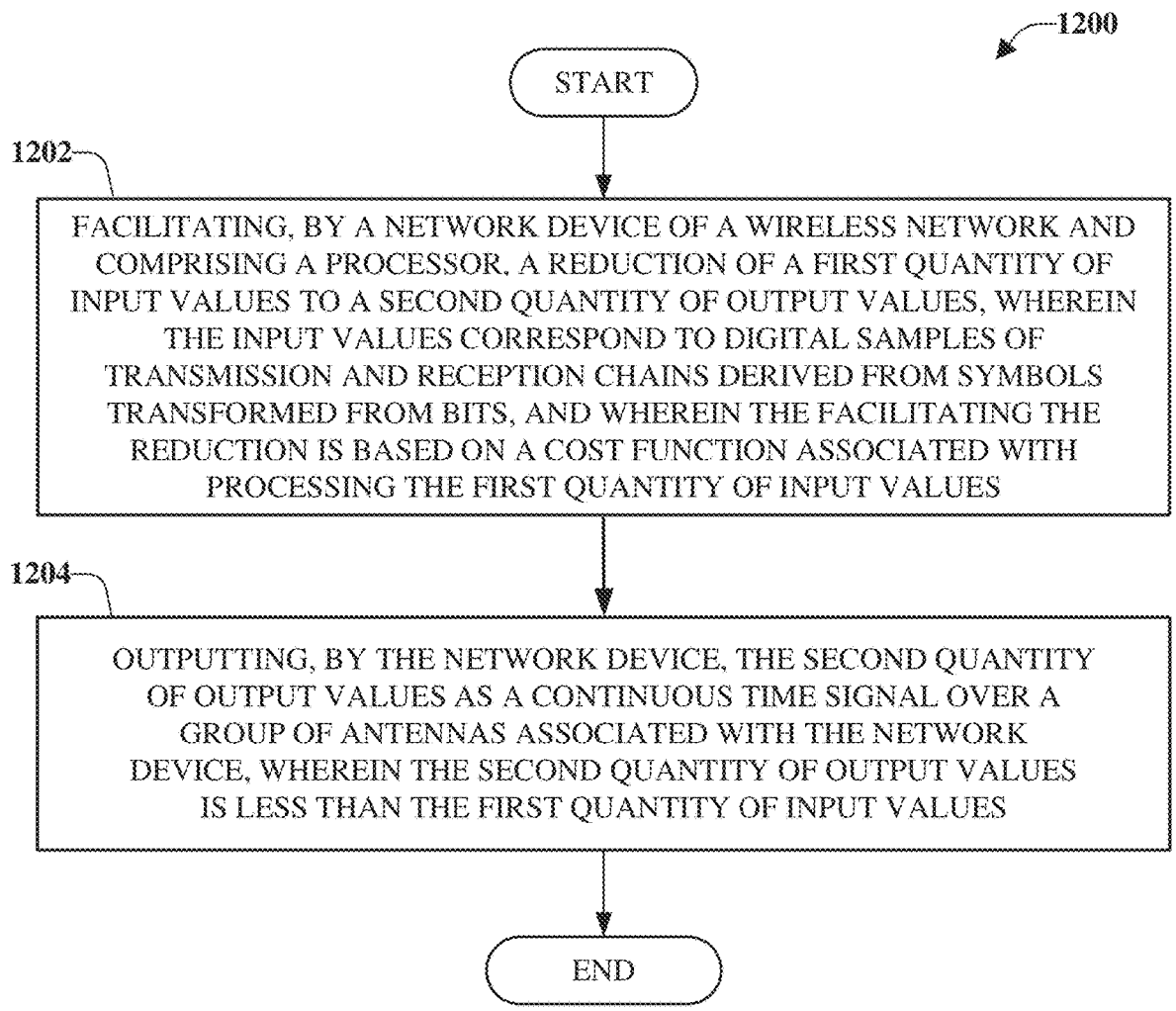
FIG. 12 illustrates an example, non-limiting, method for facilitating energy-efficient wireless communications in accordance with one or more embodiments described herein.

FIG. 12 illustrates an example, non-limiting, method 1200 for facilitating energy-efficient wireless communications in accordance with one or more embodiments described herein. Repetitive description of like elements employed in other embodiments described herein is omitted for sake of brevity. The method 1200 can be implemented by a network device of a wireless network, the network device comprising a processor. Alternatively, or additionally, a machine-readable storage medium can comprise executable instructions that, when executed by a processor, facilitate performance of operations for the method 1200.

The method 1200 starts, at 1212 with facilitating a reduction of a first quantity of input values (e.g., the inputs 806, the one or more inputs 1006) to a second quantity of output values (e.g., the outputs 808, the one or more outputs 1008). The input values can correspond to digital samples of transmission and reception chains derived from symbols transformed from bits. According to an implementation, facilitating the reduction of the first quantity of input values to the second quantity of output values can be based on a cost function associated with processing the first quantity of input values.

At 1204, the second quantity of output values can be output as a continuous time signal over a group of antennas associated with the network device. For example, the second quantity of output values can be similar to the output waveform 702, of FIG. 7. In some implementations, the second quantity of output values is less than the first quantity of input values.

Figure 13:
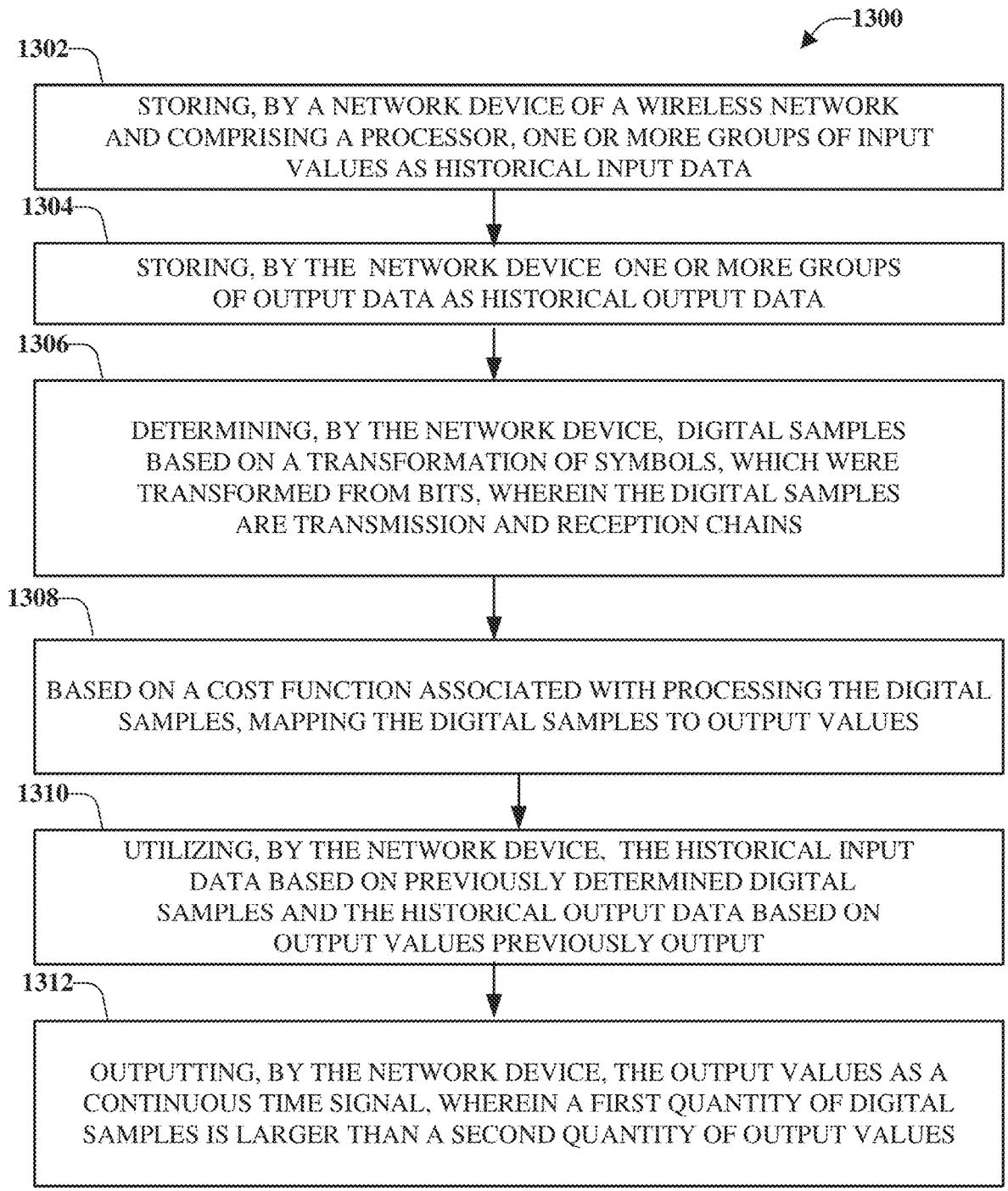
FIG. 13 illustrates an example, non-limiting, method for facilitating energy-efficient wireless communications based on historical data in accordance with one or more embodiments described herein.

FIG. 13 illustrates an example, non-limiting, method 1300 for facilitating energy-efficient wireless communications based on historical data in accordance with one or more embodiments described herein. Repetitive description of like elements employed in other embodiments described herein is omitted for sake of brevity. The method 1300 can be implemented by a network device of a wireless network, the network device comprising a processor. Alternatively, or additionally, a machine-readable storage medium can comprise executable instructions that, when executed by a processor, facilitate performance of operations for the method 1300.

At 1302, the method 1300 can include storing one or more groups of input values as historical input data. The historical input data can comprise digital samples, from a transmission chain. Further, at 1304, the method 1300 can include storing one or more groups of output values as historical output data. For example, upon or after one or more groups of input data are determined and processed as discussed herein, the group of input data and the associated group of output data can be retained as historical data.

Digital samples can be determined at 1306 based on a transformation of symbols, which were transformed from bits. Further, the digital samples can be from transmission and reception chains. The digital samples determined at 1306 can be recently determined samples (e.g., within a defined period of the current time).

At 1308, the digital samples can be mapped to output values. The mapping can be based on a cost function associated with processing the digital samples. According to some implementations, mapping the digital samples to the output values can comprise, at 1310, utilizing the historical input data based on previously determined digital samples and the historical output data based on output values previously output.

The output values can be output, at 1312, as a continuous time signal. The first quantity of digital samples is larger than a second quantity of output values. For example, bits can be transformed into symbols (e.g., via the bit-level domain 106). The symbols can be transformed into samples (e.g., via the symbol-level domain 108). The samples can be transformed into continuous waveforms (e.g., via the sample-level domain 110). The waveforms can be sent over the antennas of the base station.

In some implementations, mapping the digital samples to the output values comprises facilitating the mapping at a digital-to-analog conversion stage of a transmitter of a wireless communications system. In an example, the digital-to-analog conversion stage can comprise a non-linear filter. In another example, the digital-to-analog conversion stage can comprise a linear filter that comprises a data store.

Figure 14:
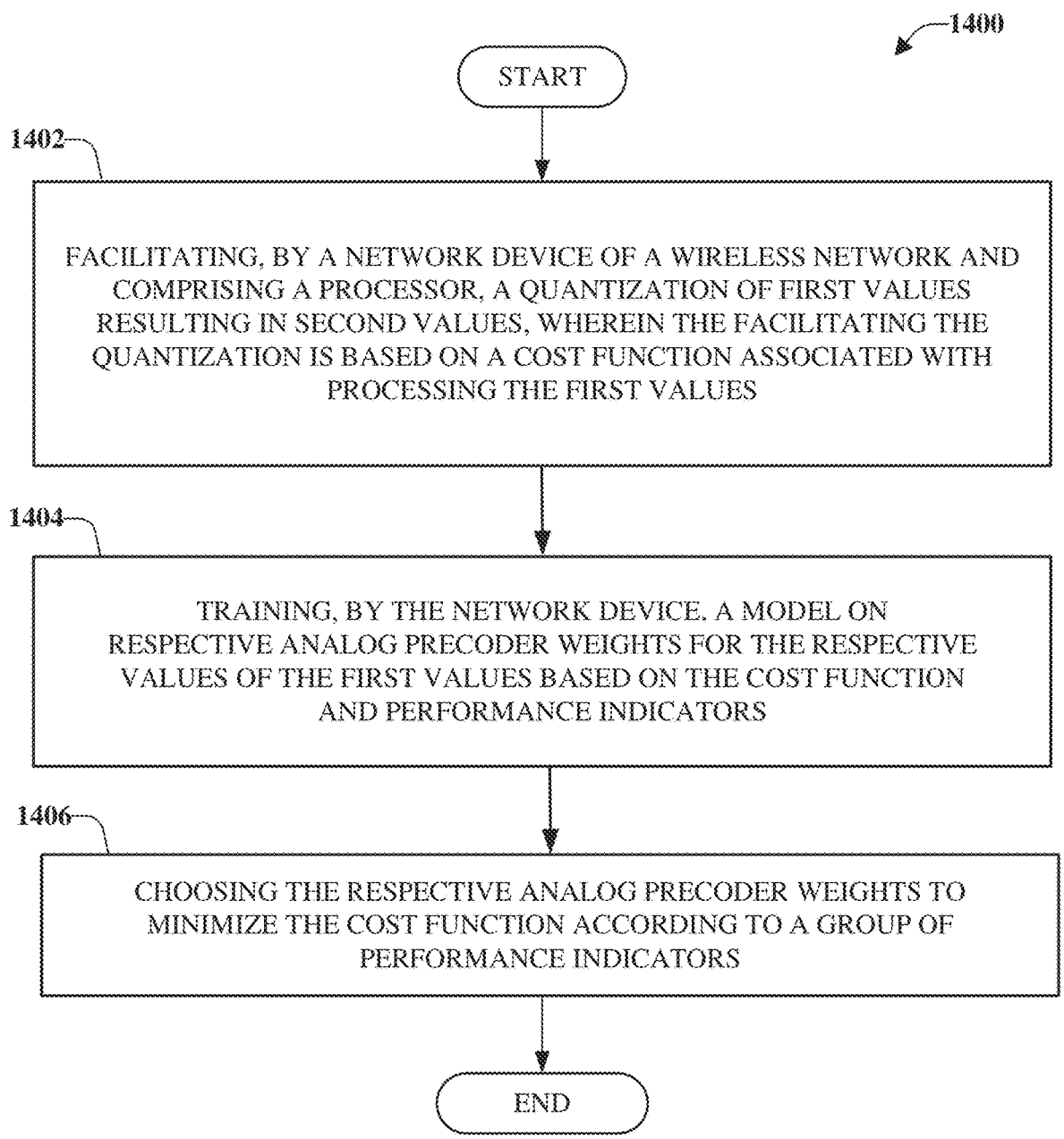
FIG. 14 illustrates an example, non-limiting, method for facilitating energy-efficient wireless communications based on machine learning in accordance with one or more embodiments described herein.

FIG. 14 illustrates an example, non-limiting, method 1400 for facilitating energy-efficient wireless communications based on machine learning in accordance with one or more embodiments described herein. Repetitive description of like elements employed in other embodiments described herein is omitted for sake of brevity. The method 1400 can be implemented by a network device of a wireless network, the network device comprising a processor. Alternatively, or additionally, a machine-readable storage medium can comprise executable instructions that, when executed by a processor, facilitate performance of operations for the method 1400.

At 1402, a quantization of first values can be facilitated, resulting in second values. Facilitating the quantization can be based on a cost function associated with processing the first values. Respective values of the first values can be digital samples of transmission and reception chains determined based on symbols, wherein bits were transformed into the symbols.

To facilitate the quantization, at 1404, a model can be trained on respective analog precoder weights for the respective values of the first values based on the cost function and performance indicators. Further, at 1406, the respective analog precoder weights can be chosen to minimize the cost function according to a group of performance indicators.

According to some implementations, facilitating the quantization can comprise minimizing a cost associated with processing the first values. In some implementations, facilitating the quantization can comprise reducing a number of bits per sample of the digital samples based on a defined number of bits. In accordance with some implementations, facilitating the quantization can comprise reducing a sampling rate of the digital samples based on a defined number of sampling rates.

Facilitating the quantization can comprise, according to some implementations, reducing a number of bits per sample of the digital samples and a sampling rate of the digital samples based on a first defined number of bits and based on a second defined number of sampling rates.

According to some implementations, facilitating the quantization can comprise facilitating the quantization at a digital-to-analog conversion stage of a transmitter of a wireless communications system. Further to these implementations, a non-liner filter can be utilized in the transmitter. Additionally, or alternatively, a linear filter that comprises a memory can be utilized in the transmitter.

Described herein are systems, methods, articles of manufacture, and other embodiments or implementations that can facilitate energy-efficient wireless communication in a 5G network. Facilitating energy-efficient wireless communication in a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 15:
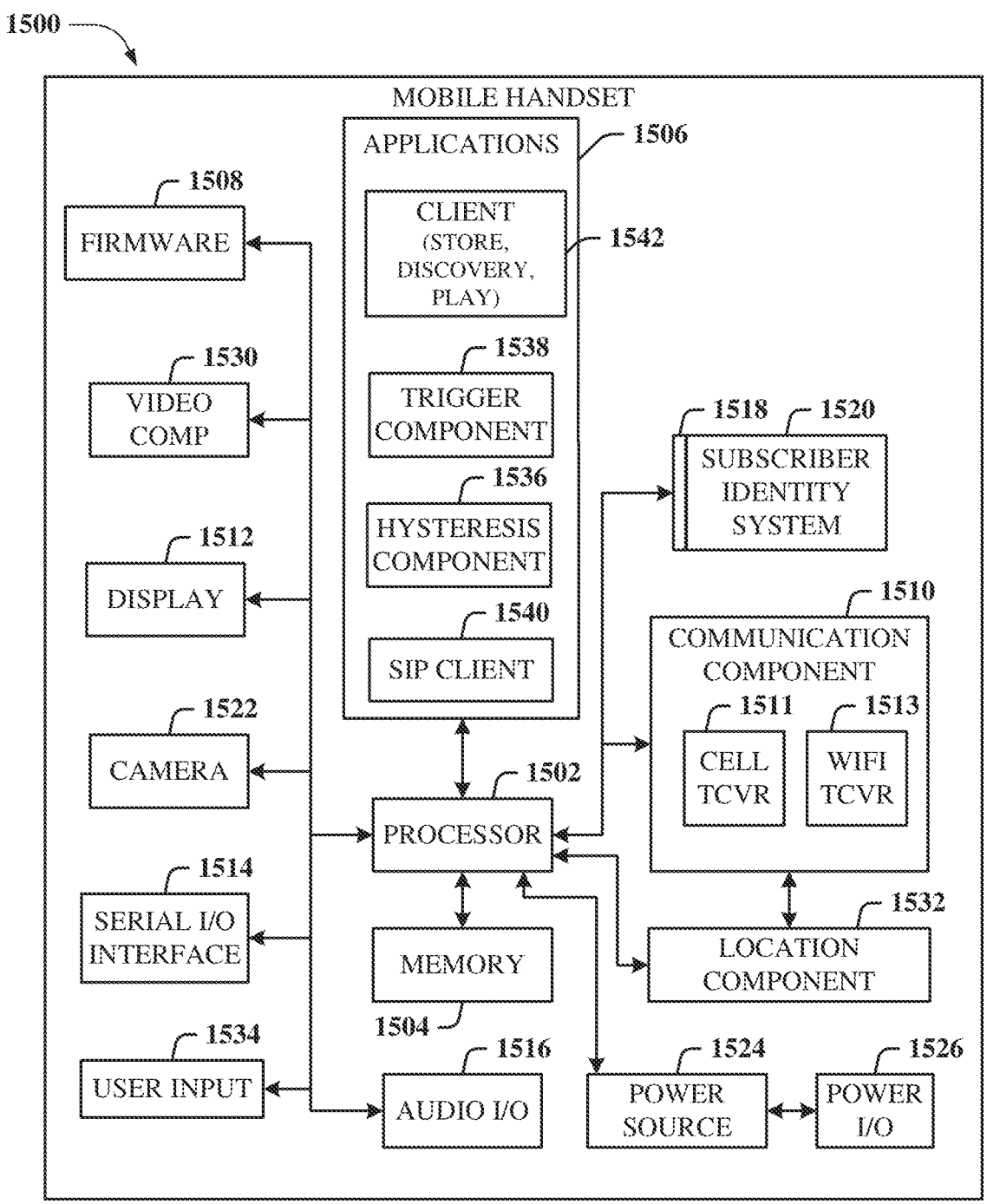
FIG. 15 illustrates an example block diagram of an example mobile handset operable to engage in a system architecture that facilitates wireless communications according to one or more embodiments described herein.

Referring now to FIG. 15, illustrated is an example block diagram of an example mobile handset 1500 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1502 for controlling and processing all onboard operations and functions. A memory 1504 interfaces to the processor 1502 for storage of data and one or more applications 1506 (e.g., a video player software, user feedback component software, etc.). Other applications can include voice recognition of predetermined voice commands that facilitate initiation of the user feedback signals. The applications 1506 can be stored in the memory 1504 and/or in a firmware 1508, and executed by the processor 1502 from either or both the memory 1504 or/and the firmware 1508. The firmware 1508 can also store startup code for execution in initializing the handset 1500. A communications component 1510 interfaces to the processor 1502 to facilitate wired/wireless communication with external systems, e.g., cellular networks, VoIP networks, and so on. Here, the communications component 1510 can also include a suitable cellular transceiver 1511 (e.g., a GSM transceiver) and/or an unlicensed transceiver 1513 (e.g., Wi-Fi, WiMax) for corresponding signal communications. The handset 1500 can be a device such as a cellular telephone, a PDA with mobile communications capabilities, and messaging-centric devices. The communications component 1510 also facilitates communications reception from terrestrial radio networks (e.g., broadcast), digital satellite radio networks, and Internet-based radio services networks.

The handset 1500 includes a display 1512 for displaying text, images, video, telephony functions (e.g., a Caller ID function), setup functions, and for user input. For example, the display 1512 can also be referred to as a "screen" that can accommodate the presentation of multimedia content (e.g., music metadata, messages, wallpaper, graphics, etc.). The display 1512 can also display videos and can facilitate the generation, editing and sharing of video quotes. A serial I/O interface 1514 is provided in communication with the processor 1502 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1500, for example. Audio capabilities are provided with an audio I/O component 1516, which can include a speaker for the output of audio signals related to, for example, indication that the user pressed the proper key or key combination to initiate the user feedback signal. The audio I/O component 1516 also facilitates the input of audio signals through a microphone to record data and/or telephony voice data, and for inputting voice signals for telephone conversations.

The handset 1500 can include a slot interface 1518 for accommodating a SIC (Subscriber Identity Component) in the form factor of a card Subscriber Identity Module (SIM) or universal SIM 1520, and interfacing the SIM card 1520 with the processor 1502. However, it is to be appreciated that the SIM card 1520 can be manufactured into the handset 1500, and updated by downloading data and software.

The handset 1500 can process IP data traffic through the communications component 1510 to accommodate IP traffic from an IP network such as, for example, the Internet, a corporate intranet, a home network, a person area network, etc., through an ISP or broadband cable provider. Thus, VoIP traffic can be utilized by the handset 1500 and IP-based multimedia content can be received in either an encoded or decoded format.

A video processing component 1522 (e.g., a camera) can be provided for decoding encoded multimedia content. The video processing component 1522 can aid in facilitating the generation, editing, and sharing of video quotes. The handset 1500 also includes a power source 1524 in the form of batteries and/or an AC power subsystem, which power source 1524 can interface to an external power system or charging equipment (not shown) by a power I/O component 1526.

The handset 1500 can also include a video component 1530 for processing video content received and, for recording and transmitting video content. For example, the video component 1530 can facilitate the generation, editing and sharing of video quotes. A location tracking component 1532 facilitates geographically locating the handset 1500. As described hereinabove, this can occur when the user initiates the feedback signal automatically or manually. A user input component 1534 facilitates the user initiating the quality feedback signal. The user input component 1534 can also facilitate the generation, editing and sharing of video quotes. The user input component 1534 can include such conventional input device technologies such as a keypad, keyboard, mouse, stylus pen, and/or touchscreen, for example.

Referring again to the applications 1506, a hysteresis component 1536 facilitates the analysis and processing of hysteresis data, which is utilized to determine when to associate with the access point. A software trigger component 1538 can be provided that facilitates triggering of the hysteresis component 1536 when the Wi-Fi transceiver 1513 detects the beacon of the access point. A SIP client 1540 enables the handset 1500 to support SIP protocols and register the subscriber with the SIP registrar server. The applications 1506 can also include a client 1542 that provides at least the capability of discovery, play and store of multimedia content, for example, music.

The handset 1500, as indicated above related to the communications component 1510, includes an indoor network radio transceiver 1513 (e.g., Wi-Fi transceiver). This function supports the indoor radio link, such as IEEE 802.11, for the dual-mode GSM handset 1500. The handset 1500 can accommodate at least satellite radio services through a handset that can combine wireless voice and digital radio chipsets into a single handheld device.

Figure 16:
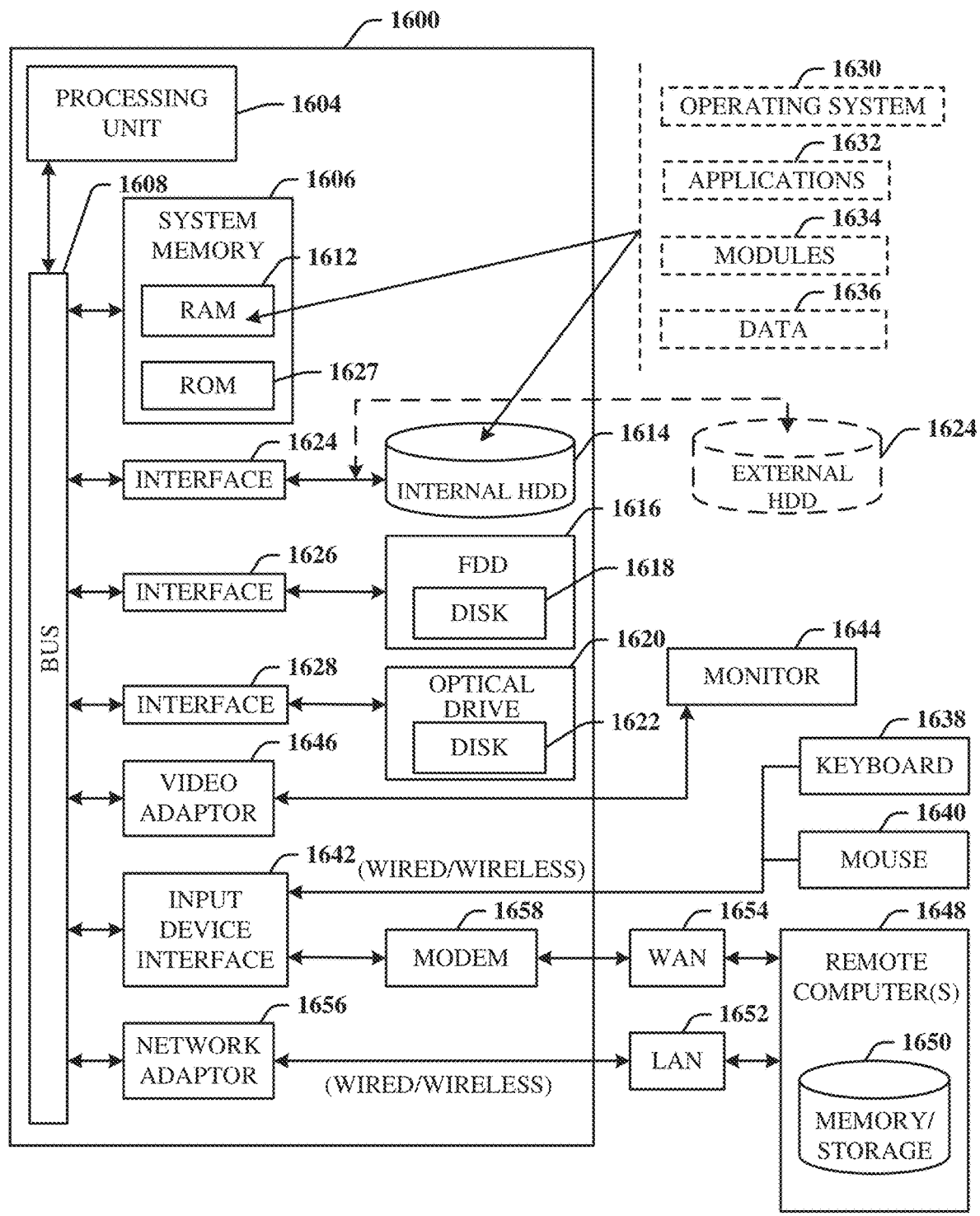
FIG. 16 illustrates an example block diagram of an example computer operable to engage in a system architecture that facilitates wireless communications according to one or more embodiments described herein.

Referring now to FIG. 16, illustrated is an example block diagram of an example computer 1600 operable to engage in a system architecture that facilitates wireless communications according to one or more embodiments described herein. The computer 1600 can provide networking and communication capabilities between a wired or wireless communication network and a server (e.g., Microsoft server) and/or communication device. In order to provide additional context for various aspects thereof, FIG. 16 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 16, implementing various aspects described herein with regards to the end-user device can include a computer 1600, the computer 1600 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes read-only memory (ROM) 1627 and random access memory (RAM) 1612. A basic input/output system (BIOS) is stored in a non-volatile memory 1627 such as ROM, EPROM, EEPROM, which BIOS contains the basic routines that help to transfer information between elements within the computer 1600, such as during start-up. The RAM 1612 can also include a high-speed RAM such as static RAM for caching data.

The computer 1600 further includes an internal hard disk drive (HDD) 1614 (e.g., EIDE, SATA), which internal hard disk drive 1614 can also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1600 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1600, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. It is to be appreciated that the innovation can be implemented with various commercially available operating systems or combinations of operating systems.

A user can enter commands and information into the computer 1600 through one or more wired/wireless input devices, e.g., a keyboard 1638 and a pointing device, such as a mouse 1640. Other input devices (not shown) can include a microphone, an IR remote control, a joystick, a game pad, a stylus pen, touchscreen, or the like. These and other input devices are often connected to the processing unit 1604 through an input device interface 1642 that is coupled to the system bus 1608, but can be connected by other interfaces, such as a parallel port, an IEEE 1394 serial port, a game port, a USB port, an IR interface, etc.

A monitor 1644 or other type of display device is also connected to the system bus 1608 through an interface, such as a video adapter 1646. In addition to the monitor 1644, a computer 1600 typically includes other peripheral output devices (not shown), such as speakers, printers, etc.

The computer 1600 can operate in a networked environment using logical connections by wired and/or wireless communications to one or more remote computers, such as a remote computer(s) 1648. The remote computer(s) 1648 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which can connect to a global communications network, e.g., the Internet.

When used in a LAN networking environment, the computer 1600 is connected to the local network 1652 through a wired and/or wireless communication network interface or adapter 1656. The adapter 1656 can facilitate wired or wireless communication to the LAN 1652, which can also include a wireless access point disposed thereon for communicating with the wireless adapter 1656.

When used in a WAN networking environment, the computer 1600 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 through the input device interface 1642. In a networked environment, program modules depicted relative to the computer, or portions thereof, can be stored in the remote memory/storage device 1650. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 9 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not be able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
  mapping, by network equipment comprising a processor, digital samples to output values, wherein the digital samples are transmission and reception chains, and wherein the output values comprise a first quantity of first digital samples of the digital samples and a second quantity of second digital samples of the digital samples excluding the first digital samples; and facilitating, by the network equipment, a usage of radios at the network equipment during an output of the output values without a corresponding increase in power consumption despite the first quantity of first digital samples being larger than the second quantity of second digital samples.

2. The method of claim 1, wherein the facilitating comprises outputting the output values as a continuous time signal over antennas associated with the network equipment.

3. The method of claim 1, wherein the mapping is based on a cost function associated with processing the digital samples.

4. The method of claim 1, wherein the digital samples are derived from bits transformed into symbols, and wherein the symbols are transformed into the digital samples.

5. The method of claim 1, wherein the mapping comprises utilizing historical input data based on previously determined groups of digital samples and historical output data based on previously transmitted output values.

6. The method of claim 1, wherein the mapping comprises facilitating the mapping at a digital-to-analog conversion stage of the network equipment, and wherein the digital-to-analog conversion stage comprises a non-linear filter.

7. The method of claim 1, wherein the mapping comprises facilitating the mapping at a digital-to-analog conversion stage of the network equipment, and wherein the digital-to-analog conversion stage comprises a linear filter that comprises a data store.

8. The method of claim 1, further comprising:
prior to the mapping, facilitating, by the network equipment, a quantization of the first quantity resulting in the second quantity, wherein the facilitating is based on a cost function associated with processing the first quantity.

9. The method of claim 8, wherein the facilitating comprises training a model on respective analog precoder weights for the respective values of the first quantity based on the cost function and performance indicators, and wherein the training comprises choosing the respective analog precoder weights to minimize the cost function according to a group of performance indicators.

10. The method of claim 1, wherein the network equipment is configured to operate as a fifth generation communications network equipment.

11. A system, comprising:
a processor; and
a memory that stores executable instructions that, when executed by the processor, facilitate performance of operations, comprising:

reducing a first quantity of input values to a second quantity of output values based on a cost function associated with processing the first quantity of input values, wherein the first quantity of input values correspond to digital samples of transmission and reception chains; and facilitating, at network equipment, a transmission of the second quantity of output values, wherein a power consumption of a digital-to-analog converter is mitigated during the transmitting based on the second quantity of output values being less than the first quantity of input values.

12. The system of claim 11, wherein the facilitating comprises outputting the second quantity of output values as a continuous time signal over a group of antennas associated with the network equipment.

13. The system of claim 11, wherein the reducing comprises training a model on a group of precoder weights associated with the first quantity of input values and based on a cost function of performance indicators associated with the first quantity of input values.

14. The system of claim 13, wherein the operations further comprise choosing the group of precoder weights to minimize the cost function based on the performance indicators.

15. The system of claim 13, wherein the operations further comprise choosing the group of precoder weights to maximize the cost function based on the performance indicators.

16. The system of claim 11, wherein the digital samples are derived from symbols transformed from bits.

17. The system of claim 11, wherein the network equipment comprises the digital-to-analog converter that comprises a non-linear filter.

18. The system of claim 11, wherein the network equipment comprises the digital-to-analog converter that comprises a linear filter with memory.

19. A non-transitory machine-readable medium, comprising executable instructions that, when executed by a processor, facilitate performance of operations, comprising:
facilitating a quantization of first values resulting in second values, wherein the first values are digital samples of transmission and reception chains determined based on symbols transformed from bits; and
using radios of network equipment for transmission of the second values with no corresponding increase in power consumption based on the second values comprising fewer values than the first values.

20. The non-transitory machine-readable medium of claim 19, wherein the facilitating is based on a cost function associated with processing the first values, and wherein the second values are transmitted as a continuous time signal over antennas of the network equipment.

* * * * *